(12) United States Patent
Chen

(10) Patent No.: US 7,369,128 B2
(45) Date of Patent: May 6, 2008

(54) METHOD AND COMPUTER PROGRAM FOR CONSTRUCTING COMPLEX STRUCTURE GRAPHIC

(75) Inventor: Ming-Jang Chen, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 228 days.

(21) Appl. No.: 11/403,921

(22) Filed: Apr. 14, 2006

(65) Prior Publication Data
US 2006/0232581 A1 Oct. 19, 2006

(30) Foreign Application Priority Data
Apr. 15, 2005 (TW) .............................. 94112091 A

(51) Int. Cl.
G06T 1/00 (2006.01)
G06T 11/20 (2006.01)
G09G 5/00 (2006.01)
G06F 3/33 (2006.01)
G09G 5/08 (2006.01)
G06T 15/00 (2006.01)

(52) U.S. Cl. ............... 345/440; 345/418; 345/619; 345/468; 345/157; 715/700; 715/764; 715/856

(58) Field of Classification Search ................ 345/418, 345/588–589, 619–625, 630, 636, 637, 643, 345/649–652, 440–442, 468, 475, 520, 35, 345/156–163; 715/700, 764, 799, 856–862; 717/125, 132, 136
See application file for complete search history.

(56) References Cited

U.S. PATENT DOCUMENTS 6,323,863 B1 * 11/2001 Shinagawa et al. ......... 345/441
2002/0149604 A1 * 10/2002 Wilkinson .................. 345/643

\* cited by examiner

*Primary Examiner*—Wesner Sajous
(74) *Attorney, Agent, or Firm*—Harness, Dickey & Pierce, P.L.C.

(57) ABSTRACT

A general complex structure graph constructing method and the associated computer program is described. The generators and initiators selected by the user are used as the geometrical graphing basis. Using the transformation information of the generators and the operation information between the generators and the initiators, the geometrical transformation and duplication of the objects are performed according to the definitions of duplication objects and connecting objects. This implements the geometrical graphing of complex structures. It is characterized in that: the operations are performed in a visualized way, including graphing operations (e.g., generation of objects), parameter transmissions (e.g., shifted duplications), and data generation (e.g., generation of a geometrical graph). Since the operations are simple and can be implemented on all computer executable platforms and is suitable for artistic designs, graphing, and teaching.

20 Claims, 11 Drawing Sheets

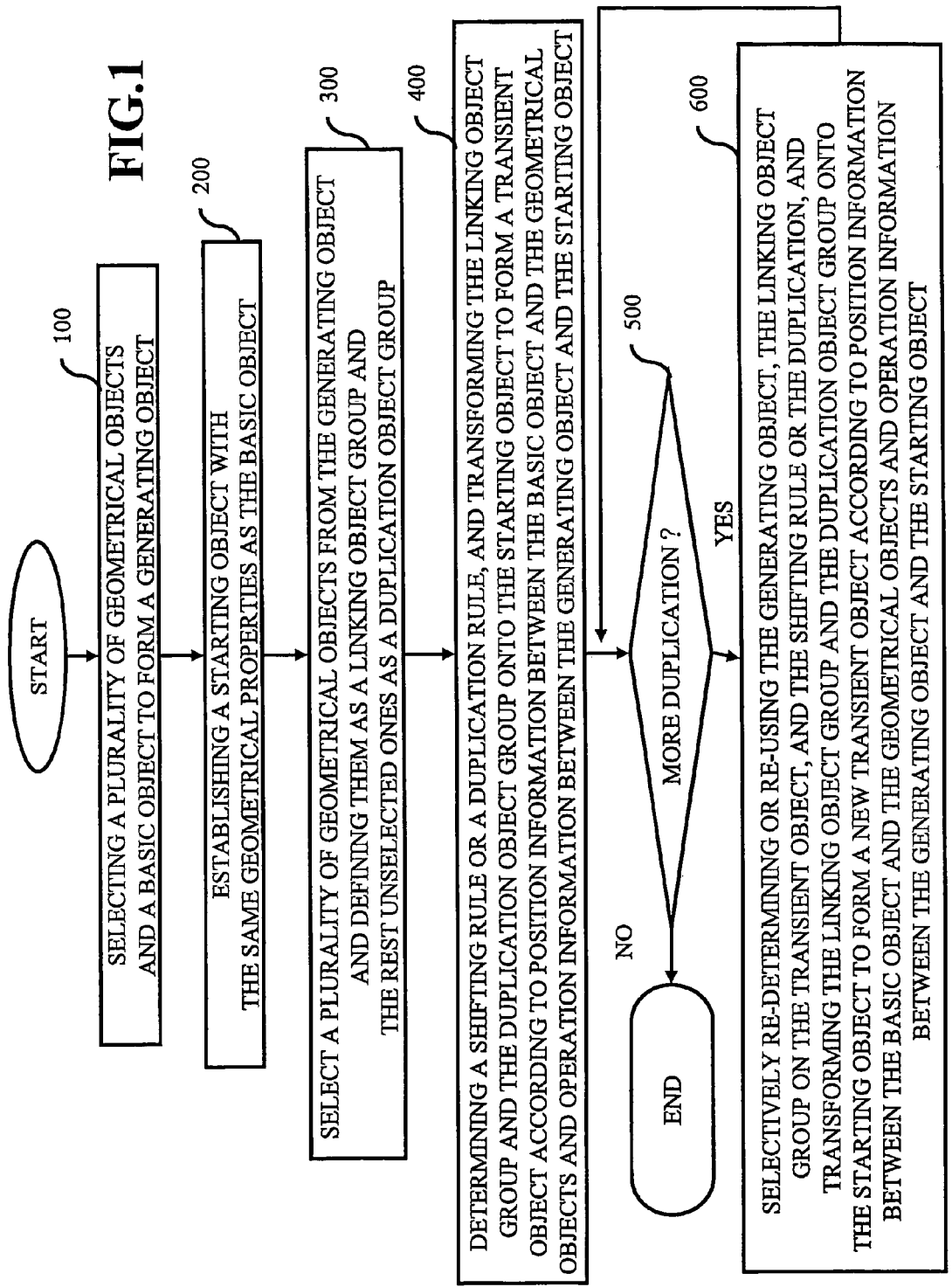

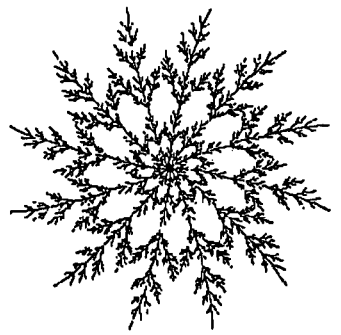
FIG.2A
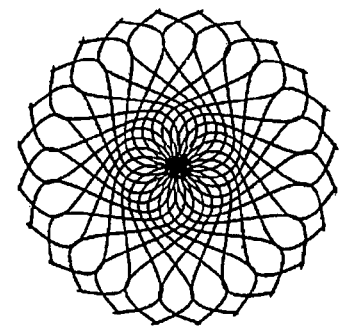
FIG.2B
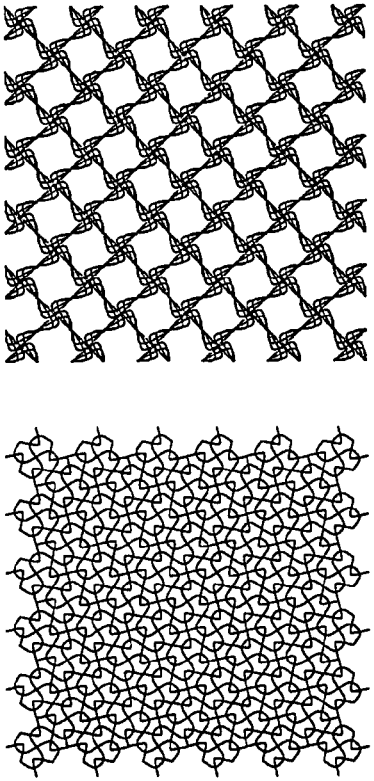
FIG.2C
FIG.2D
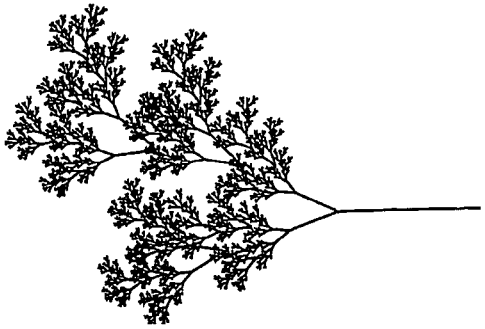
FIG.2E
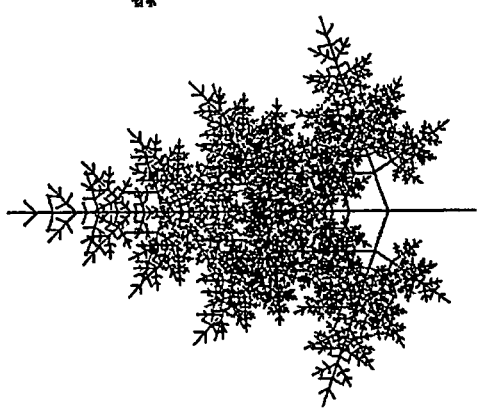
FIG.2F
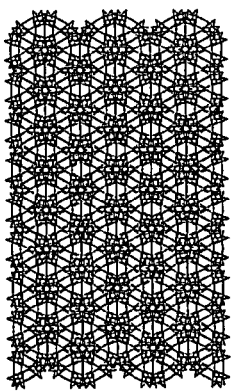
FIG.2G
FIG.2H

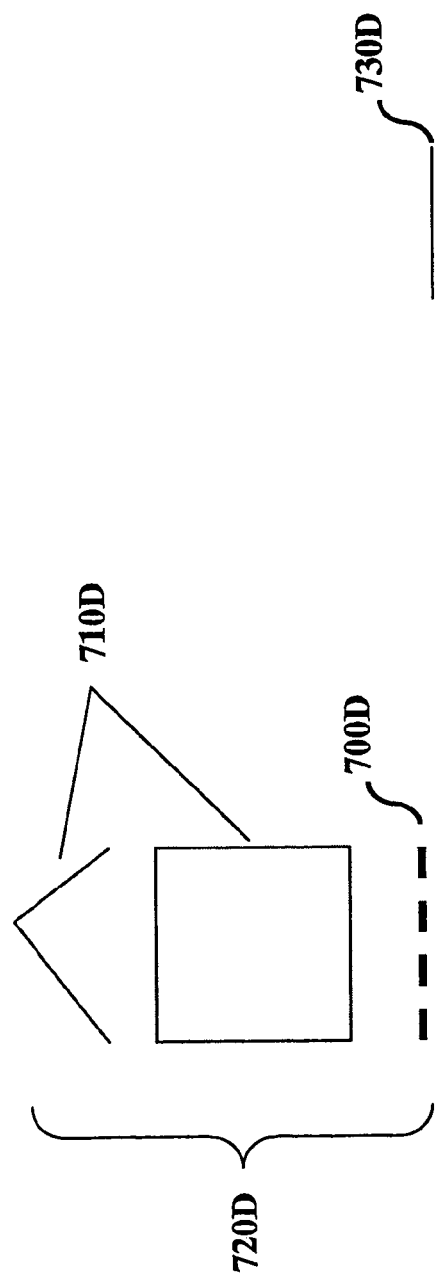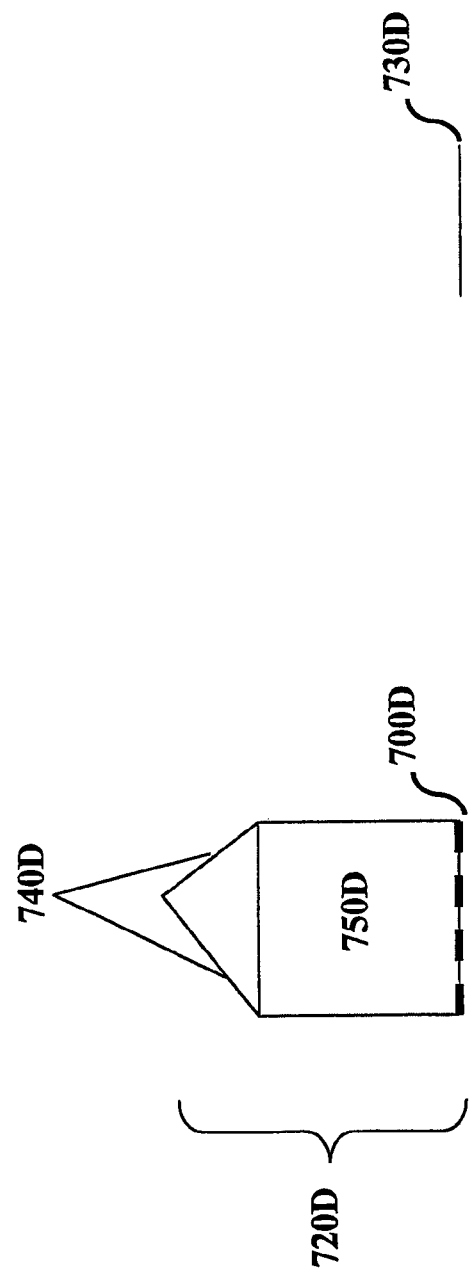

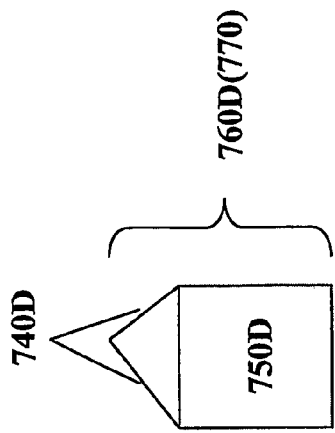
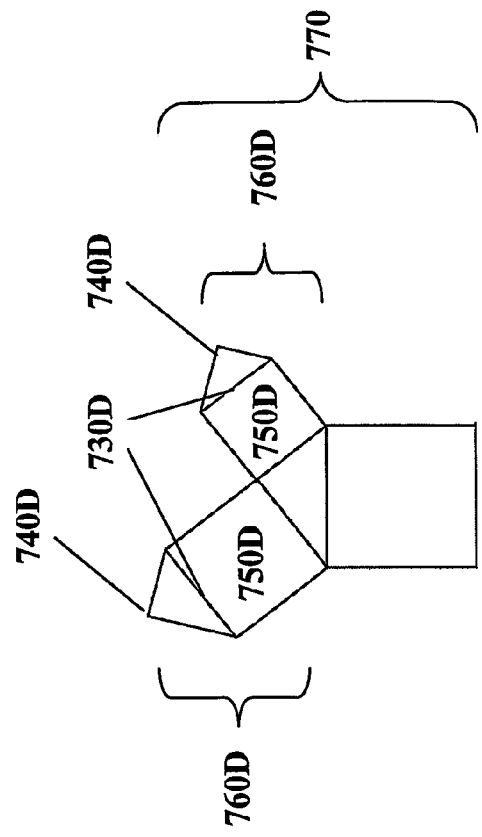
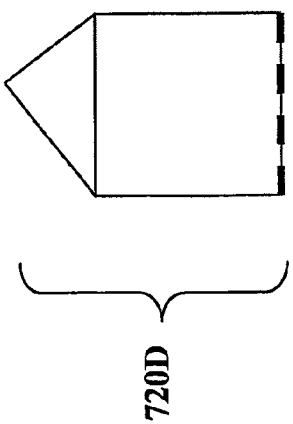
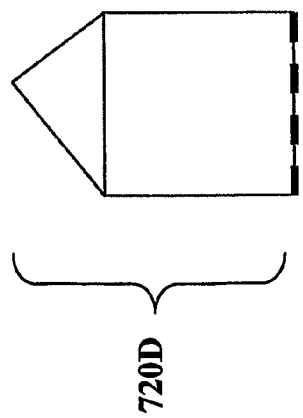
FIG.4C
FIG.4D

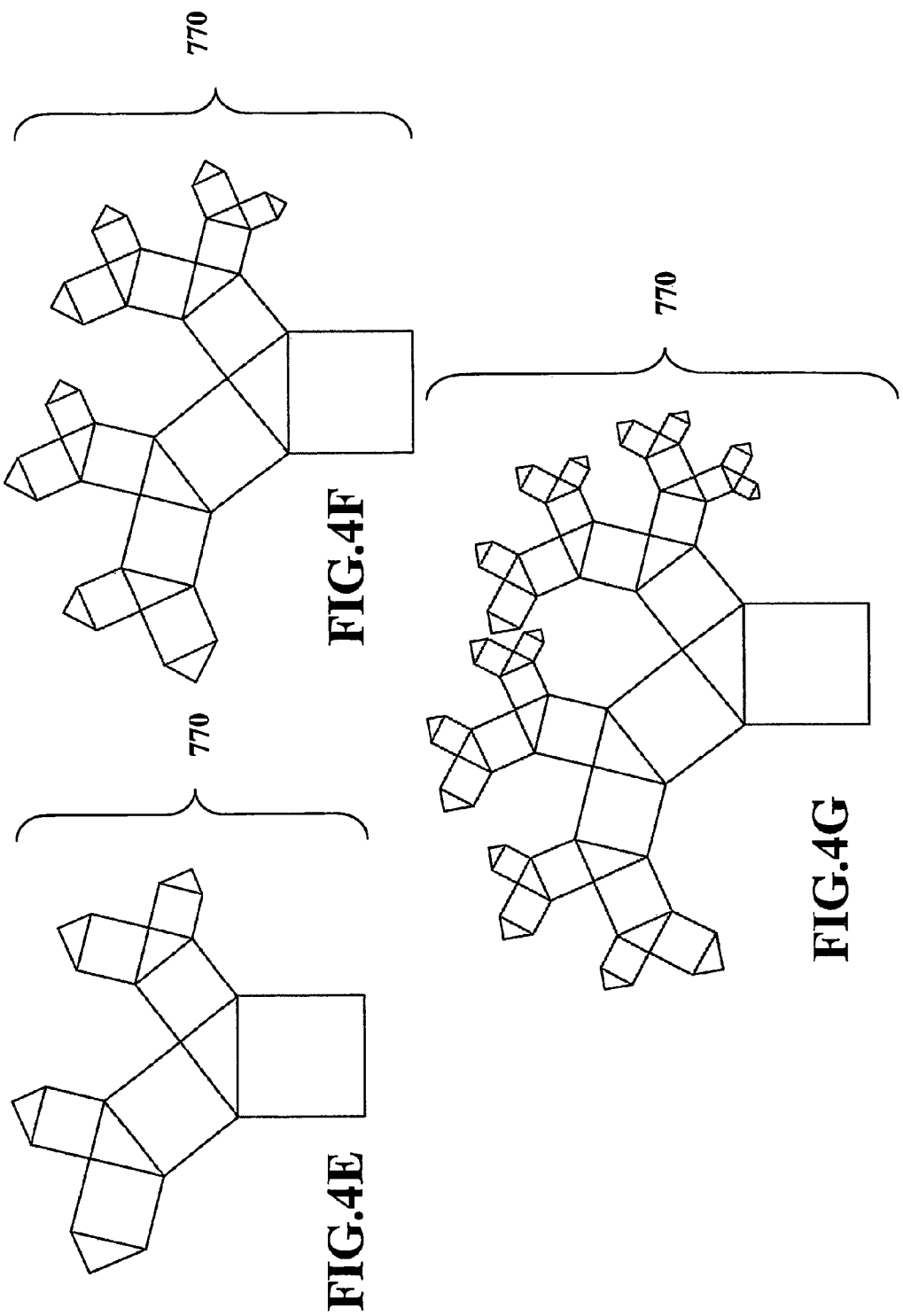

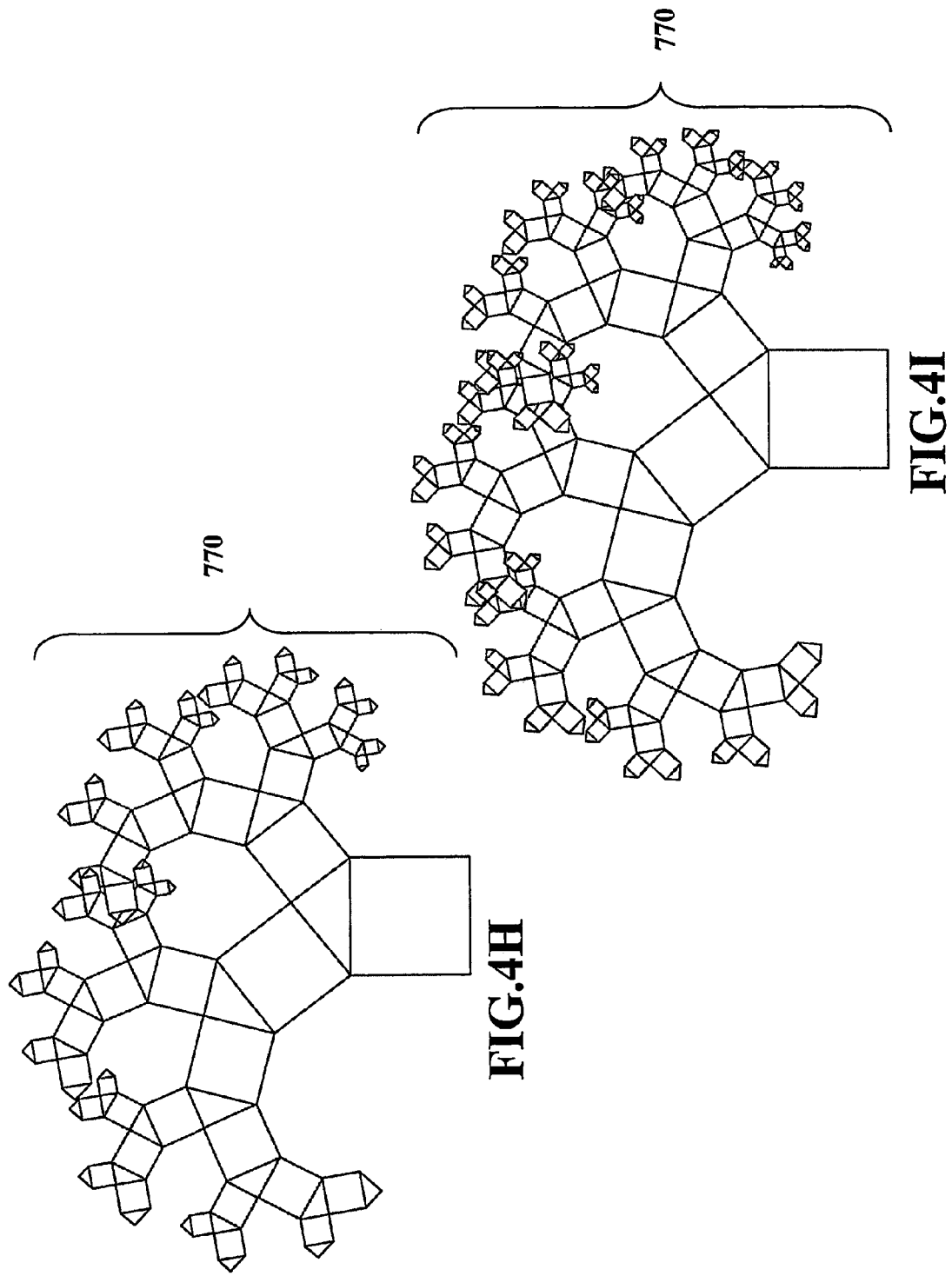

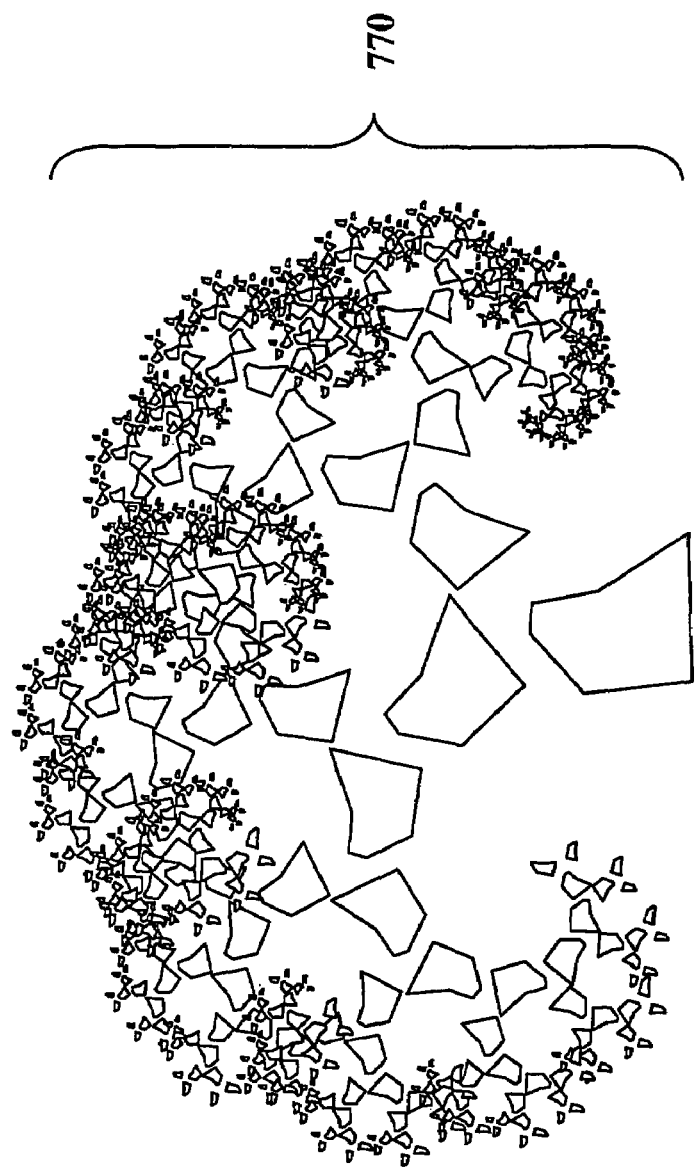
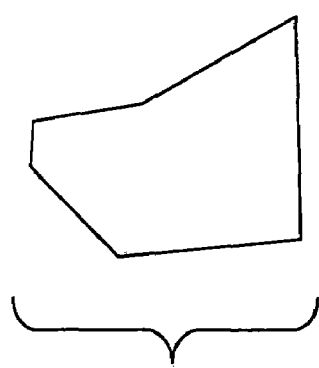
FIG.4K

METHOD AND COMPUTER PROGRAM FOR CONSTRUCTING COMPLEX STRUCTURE GRAPHIC

CROSS-REFERENCE TO RELATED APPLICATIONS

This non-provisional application claims priority under 35 U.S.C. § 119(a) on patent application Ser. No(s). 94112091 filed in Taiwan, R.O.C. on Apr. 15, 2005, the entire contents of which are hereby incorporated by reference.

BACKGROUND OF THE INVENTION

1. Field of Invention

The invention relates to a method for constructing a complex structure graph and related computer program, and more particularly, to a method for constructing a complex structure graph and related computer program that can be implemented on computer executable platforms to generate geometrical graphs using the transformation information of generators and the operation information between the generators and the initiator.

2. Related Art

Traditionally, the generation of a complex graph mostly relies on manual graphing or some professional graphing software, such as AutoCAD, Flash, PhotoShop, Illustrator, CorelDraw, and Visio. Even though manual graphing can overcome all sorts of complex structure graphing, it often requires a lot of time to accomplish. Also, the precision of manual graphing cannot achieve a certain standard. As to the professional graphing software, although all such programs provide some special graphing tools to rapidly and precisely make complex graphs, they are still limited by their intrinsic orientations in graphing. Therefore, one often has to select from these programs to get one that is suitable for his or her professional needs.

In fact, there are many special and complex patterns in the field of complex structure graphing. For example, the fractals are patterns formed with a huge amount of similar elements. If one wants to draw such kinds of graphs by hand, it is simply a waste of time and the precision is unsatisfactory. If one wants to use some professional graphing software to do the job, it is often limited by the tools provided by the program and the user has very limited freedom in graphing. Although there are other professional software that can build mathematical models, such as MatLab, Mathematica, and GSP, for people to construct the above-mentioned complex geometrical graphs, these professional programs require a lot of training and are not suitable for normal users.

Other applications such as Mathlet used in web page designs have only dedicated functions and their development standards are not completely settled yet. Therefore, they are even less popular.

In fact, to plot a complex structure graph based on the above-mentioned geometrical structure can be done by first analyzing the structure of the whole structure. One then selects a corresponding duplication rules according to the structure. Such complex structure graphs can then be generated by repeated duplications. Take the fractals as an example, some commonly seen complex structure graphs in nature, such as flowers, grass, trees, mountains, rocks, waves, stars, clouds, lightning, snowflakes, etc belong to this category. Their basic structures can be described using fractals. Basically, the fractals have the properties of self-similarity, symmetry, and self-affinity. If these ideas can be implemented by the invention, it is then an easy job to make any complex structure graph.

However, all the related programs on computer executable platforms have very little compatibility. Visually, it is still very difficult to precisely select geometrical objects in a complex structure using a pointing device (e.g., the mouse). Moreover, when there are too many objects to be selected, it is often hard to provide an efficient selection tool. Therefore, such a task becomes very time-consuming. The positioning and various operations (e.g., rotation, moving, zooming) for the geometrical objects cannot be easily done by purely manual operations.

To simplify the graphing with a complex structure and to increase the freedom in manipulations for a wider range of users, it is necessary to provide a better general structure that can be implemented on all computer executable platforms and other application programs. Therefore, the threshold of making complex structure graphs can be lowered.

SUMMARY OF THE INVENTION

In view of the foregoing, the invention provides a general method for constructing a complex structure graph and related computer program. Using the transformation information between the base objects and geometrical objects in generators defined by the user and the operation information between the generators and initiators also defined by the user, the user selects geometrical objects as the recurrent object group or duplication object group and determines specific shifting rules or duplication rules to perform geometrical transformations and duplications on the objects according to the position and operation information. Therefore, the invention can achieve the goal of graphing complex structures.

The disclosed method makes use of a computer program running on a computer executable platform. The method includes the following steps. First, generators composed of geometrical objects and base objects are selected. Initiators with the same geometrical properties as the base objects are established. At least one geometrical object is selected from the generators and defined as a recurrent object group. The rest are defined as a duplication object group. Necessary shifting rules or duplication rules are determined. The transformation information between the base objects and the geometrical objects and the operation information between the generators and the initiators are used to transform the recurrent object group and the duplication object group to the initiator to form a transient object. To continue duplications, one can selectively re-determine the generators, the recurrent object group on the transient object, and the shifting rules or duplication rules. With the transformation information between the base objects in the generators and the geometrical objects along with the operation information between the generators and the initiators, the recurrent object group and the duplication object group are transformed to the initiator for generating a new transient object.

During the complex graph constructing process, the user can use a user interface (UI) of the computer program to determine the starting process, duplication times, and ending process of a complex graph. The extraction and transmission of information during the manipulating process can be achieved by a pointing device such as the mouse.

The disclosed computer program runs on a computer executable platform. It can be added to other graphing program or browser as a plug-in program too. Therefore, it is very general. Through conditional selecting rules, the user can rapidly choose complex objects. This greatly reduces the operational difficulty and increases the operational efficiency for complex structure graphing. At the same time, the invention also increases the variety of constituent graphs.

Another feature of the invention is that the complete process is performed in a visualized way, including graphing operations, parameter transmissions, and data generation. Therefore, the invention presents the complex structure graph in a simple visualized way.

The disclosed computer program can provide a complex structure graphing environment with more freedom. Through a set of consistent designing standards, the computer program of the invention can be made more popular.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein:

FIG. 1 is a flowchart of the disclosed general complex structure graph constructing method;

FIGS. 2A to 3H are examples of complex structure graph of the disclosed invention;

FIGS. 4A to 4K are schematic views of the disclosed method according to a preferred embodiment;

DETAILED DESCRIPTION OF THE INVENTION

The invention discloses a general complex structure graph constructing method and the associated computer program. The disclosed computer program can be either an independent application program or an add-on program. It runs on a computer executable platform. When the disclosed computer program functions as an independent program, it provides a UI. When it functions as an add-on program, it runs within the UI of the other program or browser. The user can perform various graphing operations. He or she can arbitrarily determine the starting process, duplication times, and ending process of the complex structure graphing during the operation process. This achieves the goal of allowing the user to self-define operations.

When the disclosed computer program exists in the form of an add-on program, it can be used in graphing software Illustrator, the presentation software PowerPoint, Open Office, the briefing software Impress, the flowchart plotting software Visio, or Mathlets on the web browser. The computer executable platform includes, in addition to the personal computer and notebook computer, any platform with operation processing power to execute the above-mentioned graphing software, presentation software or browser. The personal computer and the notebook computer of the computer executable platform each includes a computer readable-medium to encode the program.

Once the user starts the disclosed computer program, the complex structure graph constructing method of the invention performs the following steps.

Figure 3D:
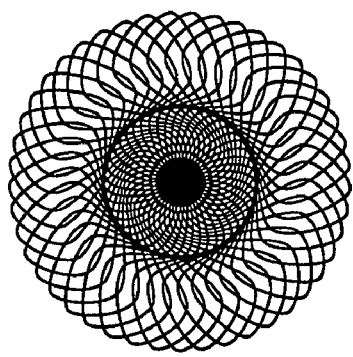
Figure 3H:
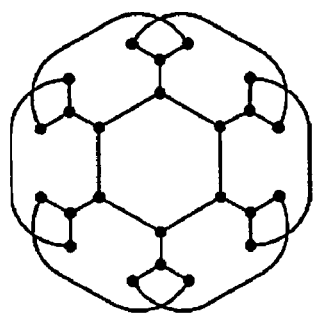
Figure 3C:
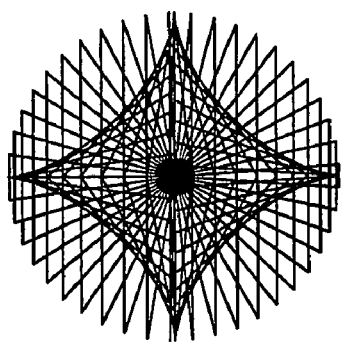
Figure 3G:
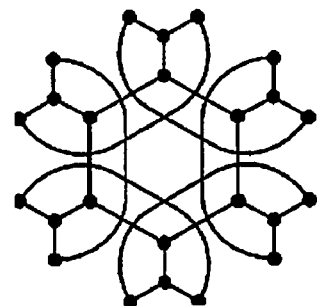
Figure 3B:
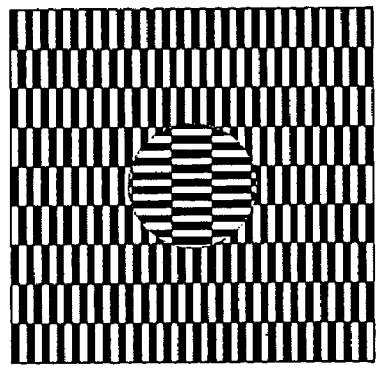
Figure 3F:
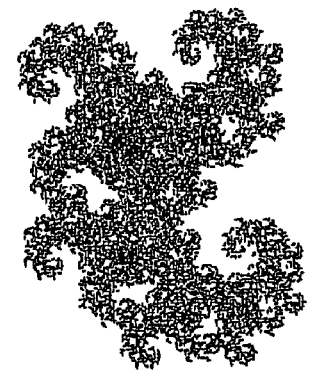
Figure 3A:
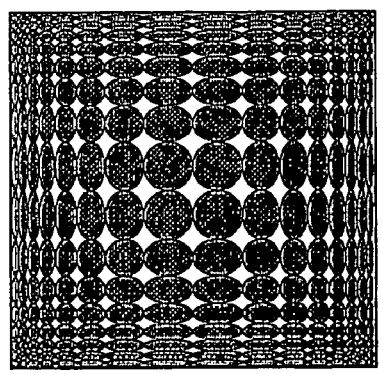
Figure 3E:
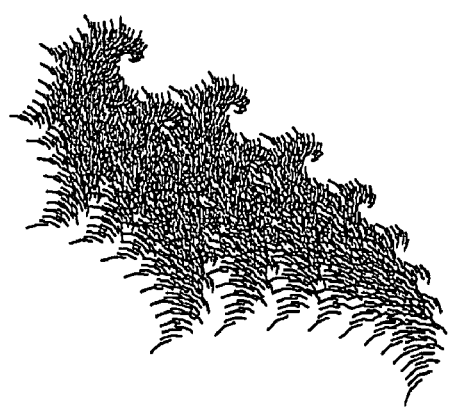
Figure 4J:
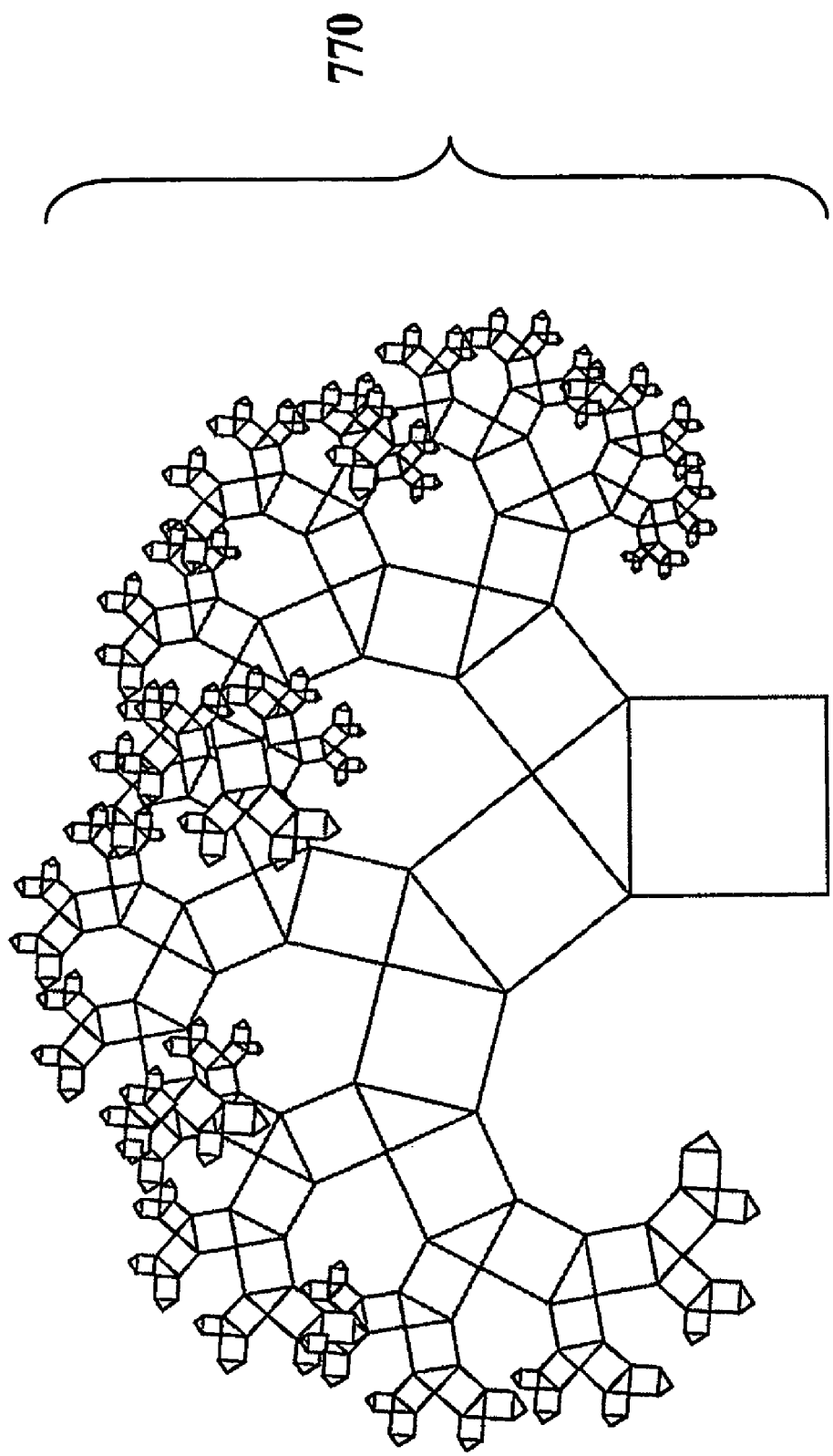

First, the user uses the function commands or a pointing device such as the mouse in the UI of the computer program to first establish a generator 720 made of a geometrical object 710 and a base object 700, as shown in FIG. 4A (step 100).

Afterwards, an initiator 730 with the same geometrical properties as the base object is established (step 200). The geometrical properties include the point, line (straight line, zigzag line, curve, etc), shape (circle, square, triangle, polygon, etc) in regular geometries and also other irregular geometries.

Once the generator and the initiator are established, the user can select to define various geometrical objects in the generator. The purpose is to select and define a recurrent object group 740 to be used for duplications in the initiator. The rest unselected geometrical objects in the generator are defined as a duplication object group 750 in the initiator (step 300).

The selected part can be achieved using the conditional selection rules provided by the disclosed computer program. These rules can be executed in the form of commands, including clicking objects, circling objects, and object properties. Object clicking means the selection of geometrical objects by direct clicking with a mouse. The selection of geometrical objects can be accumulated with the help of a keyboard. The object circling refers to the method of selecting multiple geometrical objects by specifying an area using the mouse. This method can also be supplemented with the keyboard to accumulate the selection. The project properties refer to the selection of objects of the same object properties, including shape, size, color, position, etc. Using these conditional selection rules, the user can greatly reduce the operation time during the construction of a graph. Although this specification lists the above-mentioned conditional selection rules, the invention is not limited by the embodiment.

Once the recurrent objects and the duplication objects in the generator are determined, the user can further select the shifting rule or duplication rule provided by the disclosed computer program to prepare for the geometrical transformation and duplication between the generator and the initiator. In this case, the computer program uses the transformation information between the base object and all the geometrical object (including the defined recurrent objects and the geometrical objects that are already defined as the duplication objects) and the operation information between the generator and the initiator to transform the recurrent object group and the duplication object group from the initiator to the transient object (step 400).

The so-called transformation refers to the action of geometrical transformations and duplications of geometrical objects according to the transformation information and operation information. The transformation information refers to the relative position of the base objects and all the geometrical objects in a coordinate system, including the dimension and distance. The operation information refers to the relation between the base object and the initiator, including the relative size, relative angle, mirror relation, and status relation.

The shifting rules include point shifting, line shifting, and frame shifting. Take the point shifting as an example. A base point is first set up in a geometrical object. The geometrical object is then shifted without any change to another point. In this case, the relative position of the geometrical object at the shifted point is exactly the same as that at the base point. The basic principle of the line shifting is the same as the point shifting. Since the frame shifting involves the base point, base frame, shifted point, and shifted frame, there may be shifting with angular changes in this case.

The duplication rules include point duplication, line duplication, frame duplication, symmetry duplication, and order duplication. Each duplication rule may contain more subtle rules. For example, under the frame duplication category, there may be frame shifting duplication, frame rotating duplication, frame mirror image duplication, frame shearing duplication, frame proportion duplication, and frame non-proportion duplication. Under the symmetry duplication category, there may be mirror image duplication, sliding duplication, etc. Under the order duplication category, there may be contrast duplication, arithmetical duplication, etc.

Basically, the above-mentioned shifting rules and duplication rules are not limited to the contents disclosed herein. The definitions of the transformation information and operation information are not restricted to the above-mentioned ones either. Any person skilled in the art can make new definitions according to practical needs.

After the generation of the transient object, the user can determine whether to continue the duplication action according to the needs of the complex structure graph.

The duplication refers to the operation of selectively re-determining the generators, the recurrent object group on the transient object, and the shifting rule or duplication rule, and transforming the recurrent object group and the duplication object group to the initiator to generate a new transient object according to the transformation information between the base object in the generator and the geometrical objects (step 600). Of course, the user can determine to use the original generator or the original shifting rule or duplication rule. This is complexly determined according to practical needs.

After step 600, the procedure returns to step 500 for the user to determine whether to continue duplication. The computer program repeats step 600 until the user determines not to.

FIGS. 2A to 2H and FIGS. 3A to 3H show the results of various complex structure graphs generated according to the disclosed operations.

To illustrate the feasibility of the invention, referring to FIGS. 4A to 4K, we use a preferred embodiment to explain the disclosed computer program and method.

As shown in FIG. 4A, the user establishes a generator 720, including a base object 700 and three geometrical objects 710. An initiator 730 is also established. In FIG. 4B, the user selects different geometrical objects 710 and makes individual definitions for them, dividing them into a recurrent object group 740 and a duplication object group 750. The user then performs a first geometrical transformation and duplication after selecting a duplication rule. The recurrent object group 740 and the duplication object group 750 on the generator 720 are transformed and duplicated onto the initiator 730 according to the obtained transformation information and operation information. This results in the transient object 760 in FIG. 4C. In the related field of mathematics, this transient object 760 can be considered as a first-order duplication result 770.

FIG. 4D shows the situation of continuing duplication. The user can select to re-determine the generator, the recurrent object group, the shifting rule, or the duplication rule. The next-order duplication result is generated by sending duplication commands to the computer program. In this embodiment, the user selects to use the original condition to continue. Therefore, the computer program automatically re-define the recurrent object group 740 in the transient object 760 in FIG. 4C as the new initiator 730 in FIG. 4D. It is then duplicated using the operation information between the new initiator and the base object and the transformation information of the previous generator. Two new transient objects 770 are formed on the transient object 760 of FIG. 4C, as shown on the right-hand side of FIG. 4D. The duplication result can be called the second-order duplication result 770.

The user can determine whether to continue the duplication action according to the needs. FIGS. 4E to 4J show the third-order duplication result 770 to the eighth-order duplication result 770 in this embodiment. Of course, before each duplication the user has a very high freedom to determine whether to change the generator, shifting rule or duplication rule, to make the complex structure graph more versatile.

In fact, during the complex graph construction process, the user can use the functional commands provided by the computer program or operations to make changes and adjustments on the originally established geometrical objects. Take FIG. 4K as an example, the user replaces the original square geometrical objects by irregular hexagons when producing the ninth-order duplication result 770. Therefore, the final duplication result is more complex and interesting.

Figure 5:
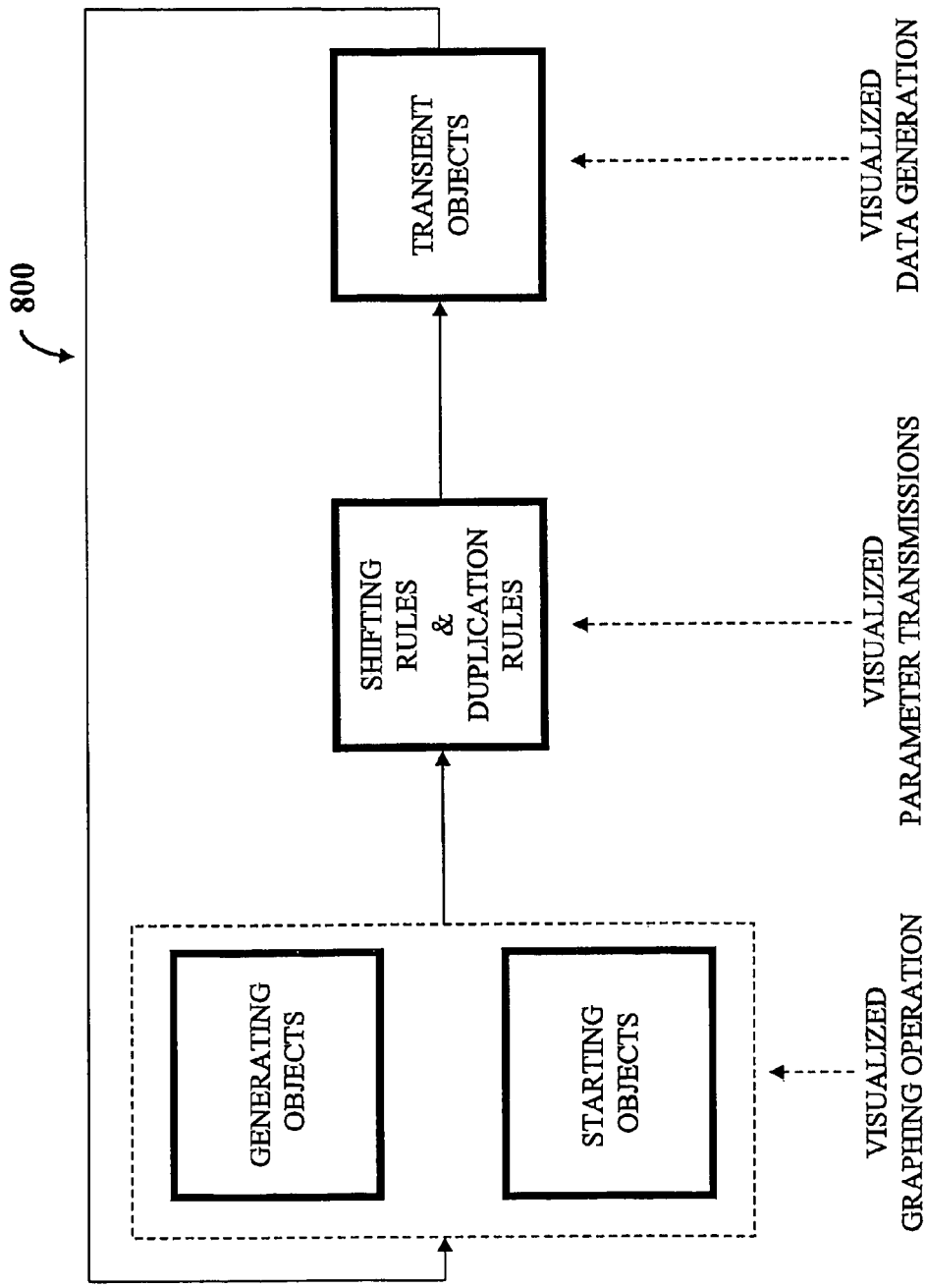
FIG. 5 is a schematic view of the main operation concept of the disclosed general complex structure graph constructing method and the computer program thereof.

The main operation concept of the disclosed complex structure graph constructing method is the general graphing logic 800. Using the selected generator and initiator, along with the use of the shifting rule or duplication rule, a duplication result with a complex structure is generated. The duplication result can be used as a new generator, which along with the use of new shifting rule or duplication rule can produce a new duplication result with a complex structure. The operation concept can be simply shown as in FIG. 5. The whole operation is performed in a visualized way. This includes visualized graphing operations (e.g. generator, initiator, etc), visualized parameter transmissions (e.g. shifting rule and duplication rule), and visualized data generation (e.g., duplication result).

Figure 6:
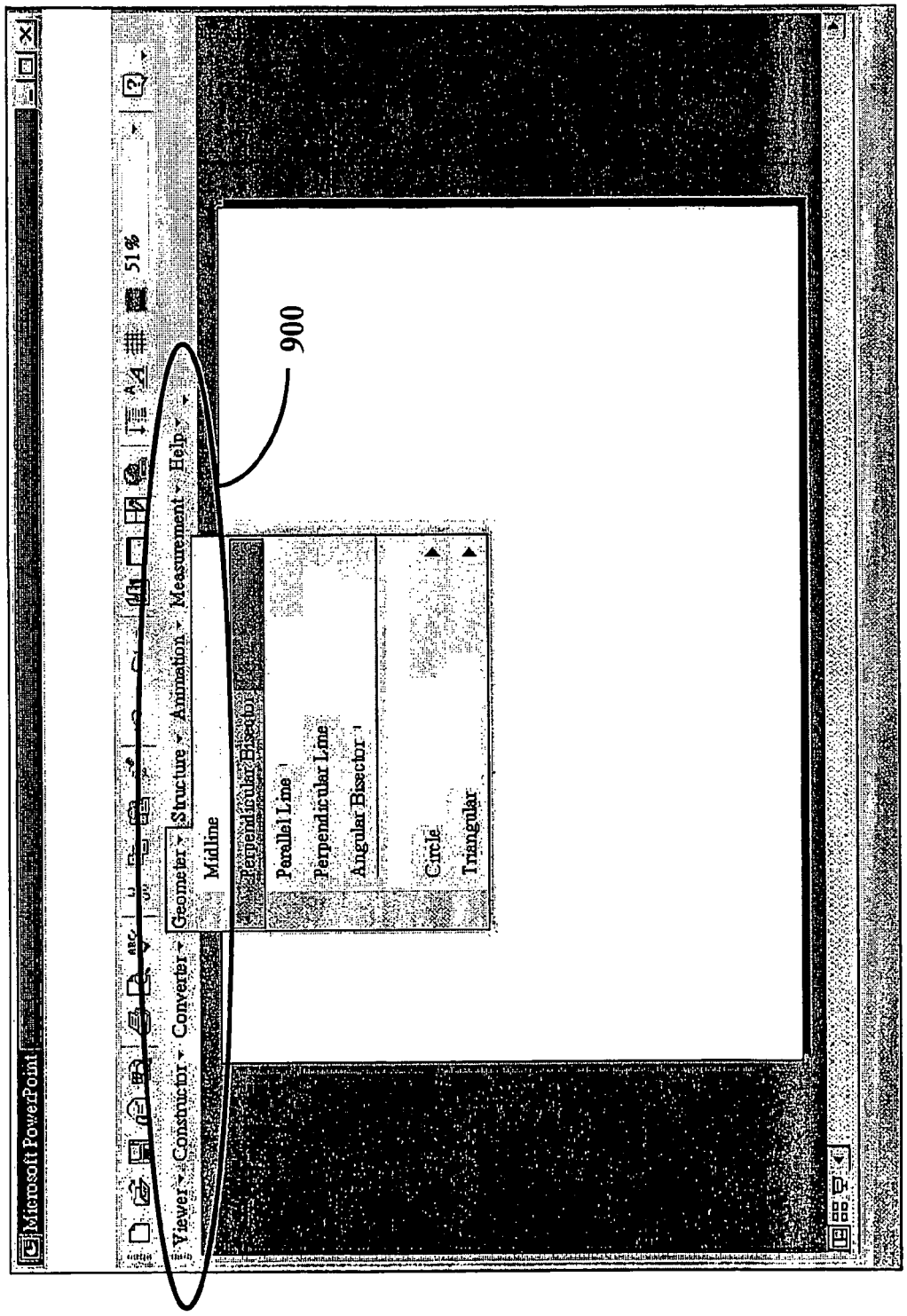
FIG. 6 is a schematic view of installing the disclosed general complex structure graphing program in MS PowerPoint.

FIG. 6 shows the embodiment of installing the disclosed computer program in MS PowerPoint. It is seen from the drawing that the disclosed computer program 900 is installed in PowerPoint in an add-in way. The user can use the functional commands under various items to perform graphing operations. In fact, the disclosed computer program can also automatically determine other related commands that are possibly performed by the user too. The related function table is displayed in an independent window (not shown) for the user to quickly select. This simplifies the operation procedure and increases the graphing efficiency.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A general complex structure graph constructing method using a computer program running on a computer executable platform to implement the complex structure graphing in a visualized way, comprising the steps of:

selecting a plurality of geometrical objects and a base object to form a generator;

establishing a initiator with the same geometrical properties as the base object;

selecting a plurality of geometrical objects from the generator and defining them as a recurrent object group and the rest unselected ones as a duplication object group; and determining a shifting rule or a duplication rule, and transforming the recurrent object group and the duplication object group onto an initiator to form a transient object according to transformation information between the base object and the geometrical objects and operation information between the generator and the initiator;

wherein with the continual of duplication, selectively re-determining or re-using the generator, the recurrent object group on the transient object, and the shifting rule or the duplication, and transforming the recurrent object group and the duplication object group onto the initiator to form a new transient object according to transformation information between the base object and the geometrical objects and operation information between the generator and the initiator.

2. The method of claim 1, wherein the user determines to select a starting process, the number of duplication times, and an ending process through the computer program.

3. The method of claim 1, wherein a conditional selection rule selects object by at least object clicking, object circling, and object properties.

4. The method of claim 3, wherein the object properties refers to the selection of objects according to object properties of shape, size, color, and position.

5. The method of claim 1, wherein the shifting rules include point shifting, line shifting, and frame shifting, and the duplication rules includes point duplication, line duplication, frame duplication, symmetry duplication, and order duplication.

6. The method of claim 1, wherein the transformation information refers to the relative position between the base object and the geometrical objects in a coordinate system.

7. The method of claim 1, wherein the operation information include at least relative position, relative size, relative angle, mirror relation, and object status relation between the base object and the initiator in a coordinate system.

8. The method of claim 1, wherein the transformation information and the operation information are obtained and transmitted by operating a coordinate position generator.

9. A computer readable-medium storing a general complex structure graphing program running on a computer executable platform to implement the complex structure graphing in a visualized way, comprising the steps of:

selecting a plurality of geometrical objects and a base object to form a generator;

establishing a initiator with the same geometrical properties as the base object;

selecting a plurality of geometrical objects from the generator and defining them as a recurrent object group and the rest unselected ones as a duplication object group;

determining a shifting rule or a duplication rule, and transforming the recurrent object group and the duplication object group onto the initiator to form a transient object according to transformation information between the base object and the geometrical objects and operation information between the generator and the initiator; and wherein with the continual of duplication, selectively re-determining or re-using the generator, the recurrent object group on the transient object, and the shifting rule or the duplication, and transforming the recurrent object group and the duplication object group onto the initiator to form a new transient object according to transformation information between the base object and the geometrical objects and operation information between the generator and the initiator.

10. The general complex structure graphing program of claim 9, wherein the user operates to determine a starting process, the number of duplication times, and the ending process through the computer program.

11. The general complex structure graphing program of claim 9, wherein a conditional selection rule includes at least object clicking, object circling, and object properties.

12. The general complex structure graphing program of claim 11, wherein the object properties refers to the selection of objects according to object properties of shape, size, color, and position.

13. The general complex structure graphing program of claim 9, wherein the shifting rules include point shifting, line shifting, and frame shifting, and the duplication rules includes point duplication, line duplication, frame duplication, symmetry duplication, and order duplication.

14. The general complex structure graphing program of claim 9, wherein the transformation information refers to the relative position between the base object and the geometrical objects in a coordinate system.

15. The general complex structure graphing program of claim 9, wherein the operation information include at least relative position, relative size, relative angle, mirror relation, and object status relation between the base object and the initiator in a coordinate system.

16. The general complex structure graphing program of claim 9, wherein the program is installed and executed in MS PowerPoint running on the computer executable platform in an add-in way.

17. The general complex structure graphing program of claim 9, wherein the program is installed and executed in a graphing program running on the computer executable platform in an add-in way.

18. The general complex structure graphing program of claim 9, wherein the program is installed and executed in a browser running on the computer executable platform in an add-in way.

19. The general complex structure graphing program of claim 9, wherein a related function table is provided to display a plurality of executable functional commands during the user's operation.

20. The general complex structure graphing program of claim 9, wherein the transformation information and the operation information are obtained and transmitted by operating a coordinate position generator.

* * * * *